US012555909B2

(12) United States Patent
Ohshige

(10) Patent No.: US 12,555,909 B2
(45) Date of Patent: Feb. 17, 2026

(54) ANTENNA APPARATUS

(71) Applicant: CANON KABUSHIKI KAISHA, Tokyo (JP)

(72) Inventor: Reiya Ohshige, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 18/746,794

(22) Filed: Jun. 18, 2024

(65) Prior Publication Data

US 2024/0421485 A1 Dec. 19, 2024

(30) Foreign Application Priority Data

Jun. 19, 2023 (JP) ................................. 2023-100271
Nov. 13, 2023 (JP) ................................. 2023-193058

(51) Int. Cl.
*H01Q 5/50* (2015.01)
*H01Q 13/10* (2006.01)

(52) U.S. Cl.
CPC ............... *H01Q 5/50* (2015.01); *H01Q 13/10* (2013.01)

(58) Field of Classification Search
CPC ........ H01Q 5/50; H01Q 13/10; H01Q 9/0457; H01Q 9/0407; H01Q 1/50; H01Q 1/48; H01Q 1/38; H01Q 1/22
See application file for complete search history.

(56) References Cited

U.S. PATENT DOCUMENTS

2023/0155303 A1* 5/2023 Park ......................... H01Q 5/40
343/702

FOREIGN PATENT DOCUMENTS

CN 111786134 B * 2/2022 ............. H01Q 1/242
JP 2005167827 A 6/2005

OTHER PUBLICATIONS

Translation of CN_111786134_B (Year: 2022).*

* cited by examiner

*Primary Examiner* — Renan Luque
(74) *Attorney, Agent, or Firm* — Canon U.S.A., Inc. IP Division

(57) ABSTRACT

An antenna apparatus that operates at first and second operating frequencies may include: a first conductor including an aperture portion including approximately parallel first and second sides; and a feeding line separated from the aperture portion. When viewed from a stacking direction, the feeding line includes: a first portion including a portion from a first intersection of the first side and the feeding line to an open end of the feeding line, a second portion connecting a second intersection of the second side and the feeding line and a feeding unit, and a third portion connecting the first intersection and the second intersection to obliquely straddle the aperture portion, and a distance from the second intersection to one end of the second side and a distance from the second intersection to the other end of the second side are different.

16 Claims, 9 Drawing Sheets

ANTENNA APPARATUS

BACKGROUND

Field

The present disclosure relates to an antenna apparatus.

Description of the Related Art

In recent years, there has been notable use of high frequency bands and expansion of utilized bandwidth to handle high-capacity data communication. To accommodate standards (e.g., wireless LAN (local area network)) having these functions, there is a need for broadband antennas.

As slot antennas that can accommodate a plurality of frequencies, dual-band slot antennas that utilize a feeding line and shorting pins, such as that described in Japanese Patent Laid-Open No. 2005-167827, are known.

However, these dual-band slot antennas are highly dependent on frequency and thus have characteristics of narrowband antennas. Therefore, there is a problem that when a broad frequency is used, such as a 2.4-GHz band and a 5 to 7-GHz band (e.g., Wi-Fi 6E), it is difficult to attain a sufficient radiation efficiency characteristic in the corresponding frequency bands.

SUMMARY

The present disclosure has been made in view of the above problems and aims to provide an antenna apparatus, having a broadband radiation characteristic, capable of operating on a plurality of frequencies.

In order to solve the above problems, an antenna apparatus that operates at first and second operating frequencies according to some embodiments may include: a first conductor including an aperture portion including approximately parallel first and second sides; and a feeding line arranged so as to be separated from the aperture portion, wherein when viewed from a stacking direction of the aperture portion and the feeding line, the feeding line includes: a first portion that includes a portion from a first intersection of the first side and the feeding line to an open end of the feeding line, a second portion that connects a second intersection of the second side and the feeding line and a feeding unit, and a third portion that connects the first intersection and the second intersection so as to obliquely straddle the aperture portion, and a distance from the second intersection to one end of the second side and a distance from the second intersection to the other end of the second side are different.

Further features of the present disclosure will become apparent from the following description of exemplary embodiments (with reference to the attached drawings).

DESCRIPTION OF THE EMBODIMENTS

Various features, aspects, and embodiments of the present disclosure will be described hereinafter in detail, with reference to the accompanying drawings. Configurations illustrated in the following embodiments are merely examples, and the present disclosure is not limited to the illustrated configurations.

First Embodiment

Figure 1B:
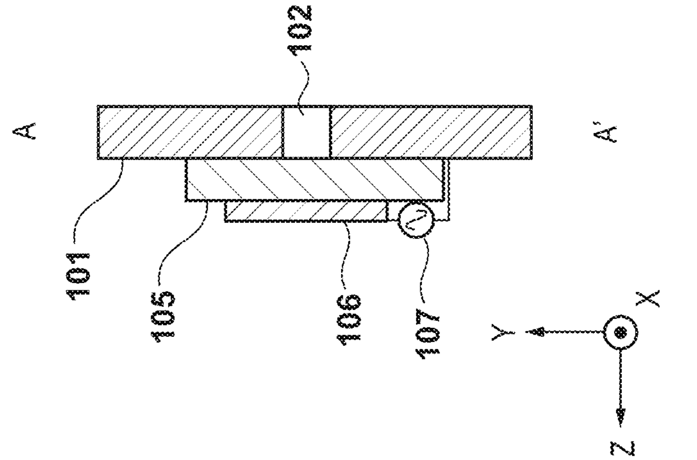
FIGS. 1A and 1B are diagrams of an overall configuration of an antenna apparatus according to some embodiments.
Figure 1A:
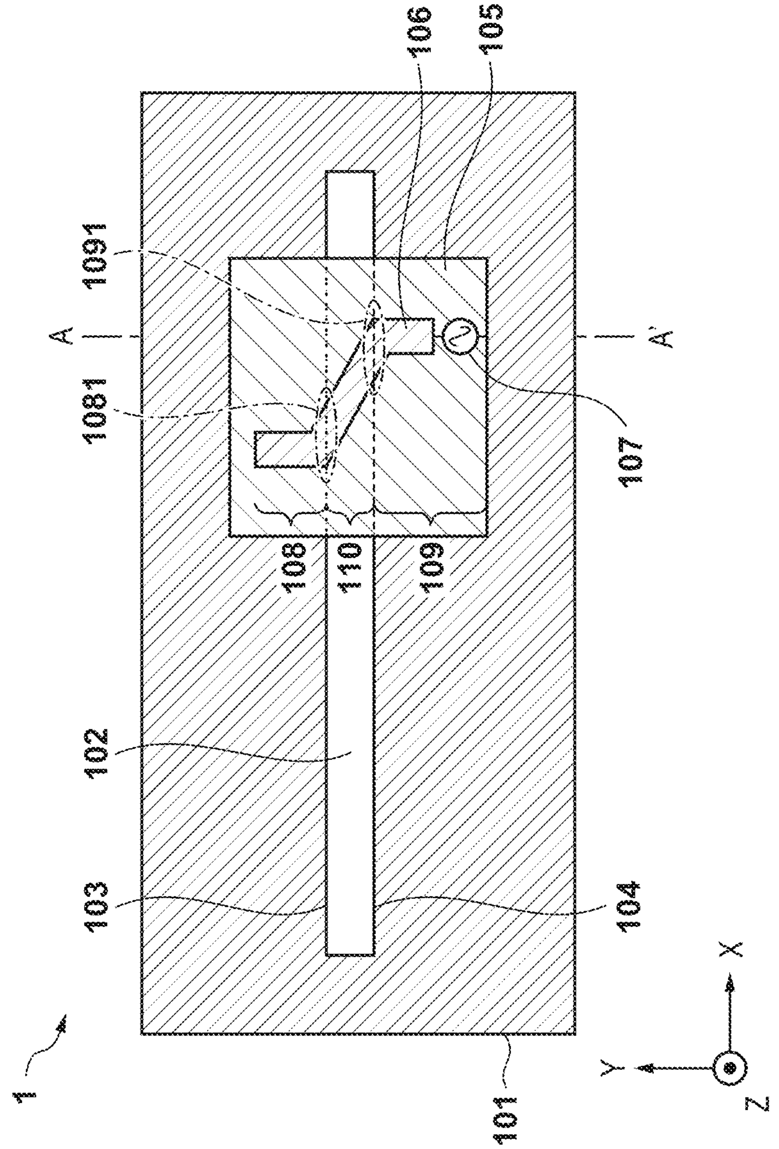

FIGS. 1A and 1B are diagrams of an overall configuration of an antenna apparatus 1 according to the present embodiment. FIG. 1B is a cross-sectional view on a YZ plane along a dashed line A-A' of FIG. 1A.

The antenna apparatus 1 includes a first conductor 101, a dielectric 105, a feeding line 106, and a feeding unit 107.

The first conductor 101 is provided with an aperture portion 102, which functions as a radiating element of the slot antenna. The aperture portion 102 includes a first side 103 and a second side 104 in a lengthwise direction. In the present embodiment, the aperture portion 102 includes a rectangular aperture surface. At least the first side 103 or the second side 104 has a length equal to one-half of a wavelength ($\lambda_1/2$) of an electromagnetic wave of a first frequency $f_1$, which is a resonant frequency.

A substrate 105 made of a dielectric is arranged at a position facing the aperture portion 102, and the feeding line 106 and the feeding unit 107 are arranged on the substrate 105. A ground (GND) of the feeding unit 107 is electrically connected to the first conductor 101. In the present embodiment, the feeding line 106 and the first conductor 101 are stacked in a Z direction. Here, as illustrated in FIG. 1B, the first conductor 101, the dielectric 105, and the feeding line 106 are illustrated such that they are stacked without a gap, but a gap may be provided therebetween; the feeding line 106 and the first conductor 101 need only be separated. In the present embodiment, the Z direction is a stacking direction and is a direction perpendicular to the aperture surface of the aperture portion 102. In some cases, the Z direction is referred to as a direction passing through the aperture surface. In the present specification, unless otherwise mentioned, the dielectric is a 1-mm thick FR4-epoxy, and the feeding line is a 35-um thick copper thin film.

The feeding line 106 is a conductor arranged to face the aperture portion 102 so as to straddle the aperture portion 102. When viewed from the stacking direction, the feeding line 106 includes a first portion (partial line) 108, a second portion 109, and a third portion 110. When viewed from the stacking direction, the first portion 108 is a partial line of the feeding line 106 that includes a portion from an intersection 1081 where the first side 103 and the feeding line 106 intersect to an open end of the feeding line 106. When viewed from the stacking direction, the second portion 109 is a partial line of the feeding line 106 that includes a portion from an intersection 1091 where the second side 104 and the feeding line 106 intersect to a feeding terminal. When viewed from the stacking direction, the third portion 110 is a partial line of the feeding line 106 obliquely straddling the aperture portion 102. Here, the intersection 1091 is arranged at a position where a distance from one end of the second side 104 to the intersection 1091 and a distance from the other end to the intersection 1091 are different. That is, the third portion 110 is arranged at a position shifted so as not to pass through the center of the aperture portion 102.

Here, the first portion 108 has an electrical length equal to one-fourth ($\lambda_1/4$) of a wavelength $\lambda$ of the first frequency $f_1$. The second portion 109 is arranged at a position that is one-half ($\lambda_2/2$) of a wavelength $\lambda_2$ of a second resonating frequency $f_2$ from one vertex of the second side 104. Since the line length of the first portion 108 is an electrical length equal to $\lambda_1/4$, the feeding line 106 and the aperture portion 102 are electrically connected.

In the present embodiment, when the first frequency $f_1$, which is a first operating frequency of the antenna apparatus 1, is set to 2.4 GHZ, $\lambda_1/2$=49 mm (millimeters), and $\lambda_1/4$=25 mm. In this case, the antenna apparatus 1 functions as a slot antenna that operates on the 2.4-GHz (gigahertz) band. Further, when the second frequency $f_2$, which is a second operating frequency of the antenna apparatus 1, is set to 5.0 GHZ, $\lambda_2/2$=32.5 mm. In this case, the antenna apparatus 1 functions as a dual-band slot antenna that also operates on the 5-GHz band. That is, the antenna apparatus 1 functions as a dual-band antenna apparatus capable of operating on the first and second operating frequencies.

The first frequency $f_1$ and the second frequency $f_2$ can be appropriately changed depending on the frequencies on which the antenna apparatus 1 operates. The wavelength 22 of the second frequency $f_2$ need only be shorter than the wavelength 21 of the first frequency $f_1$.

When a signal is inputted from the feeding unit 107 to the feeding line 106, an electromagnetic field is formed in the aperture portion 102 by current propagating through the feeding line 106. By this, at the first frequency $f_1$, a current path occurs along the edges of the aperture portion 102, and at the second frequency $f_2$, a current path occurs along the edges from one vertex of the aperture portion 102 to the third portion 110. Power is thus fed from the feeding line 106 to the first conductor 101.

The feeding line 106 includes the third portion 110 obliquely straddling the aperture portion 102. The length from the intersection 1081 to an end of the first side 103 and the length from the intersection 1091 to an end of the second side 104 are different. Therefore, when resonating at the second frequency $f_2$, the frequency dependency is lower than when resonating at the first frequency $f_1$.

Figure 2B:
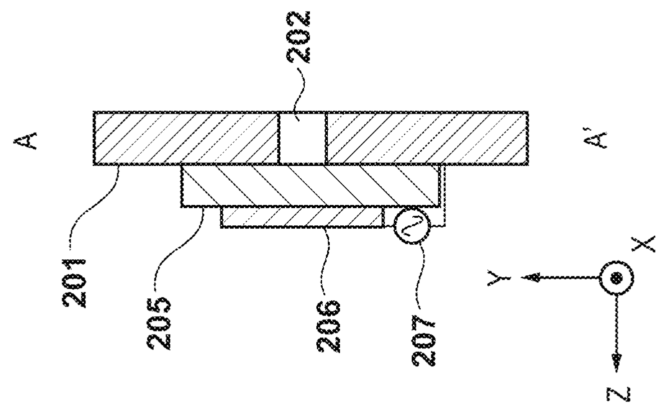
FIGS. 2A and 2B are diagrams of a configuration of a conventional antenna apparatus.
Figure 2A:
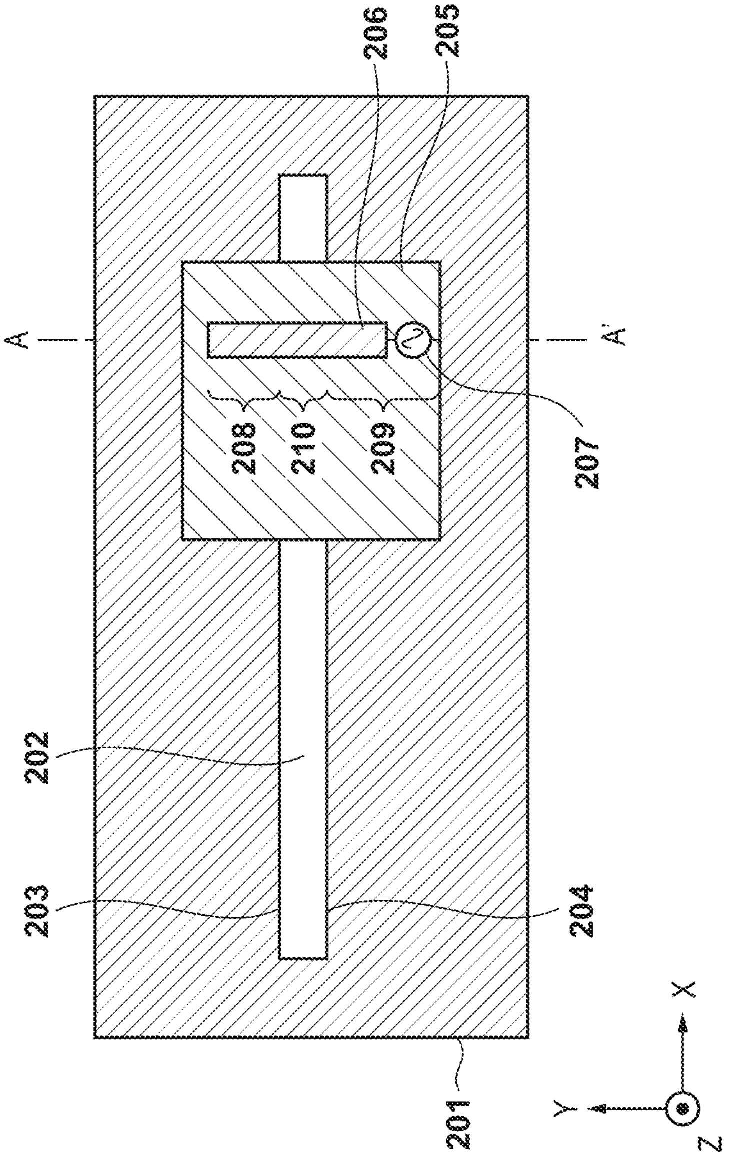

FIGS. 2A and 2B illustrate a configuration in which the third portion 110 of the feeding line 106 and the first side 103 and the second side 104 of the aperture portion 102 are arranged so as to be perpendicular when viewed from the Z direction. A first conductor 201 corresponds to the first conductor 101 of FIG. 1A, an aperture portion 202 corresponds to the aperture portion 102 of FIG. 1A, a first side 203 corresponds to the first side 103 of FIG. 1A, and a second side 204 corresponds to the second side 104 of FIG. 1A. A dielectric 205 corresponds to the dielectric 105 of FIG. 1A, and a feeding unit 207 corresponds to the feeding unit 107 of FIG. 1A. A feeding line 206 includes a first portion 208, a second portion 209, and a third portion 210. Description will be omitted for components other than the third portion 210 as they are similar to those in FIGS. 1A and 1B.

Also in a form illustrated in FIGS. 2A and 2B, when an electromagnetic wave of the first frequency $f_1$ is fed from the feeding line 206, a current path occurs along the edges of the aperture portion 202. Meanwhile, when an electromagnetic wave of the second frequency $f_2$ is fed from the feeding line 206, a current path occurs along the edges from one vertex of the aperture portion 202 to the third portion 210.

However, since the feeding line 206 includes the third portion 210, which is perpendicular to the aperture portion 202 when viewed from the stacking direction, electrical path lengths in the first side 203 and the second side 204 are the same. Therefore, a radiation efficiency characteristic of an antenna apparatus the second frequency $f_2$ is narrowband compared to a radiation efficiency characteristic of the antenna apparatus 1 with the configuration of FIG. 1A.

Figure 3:
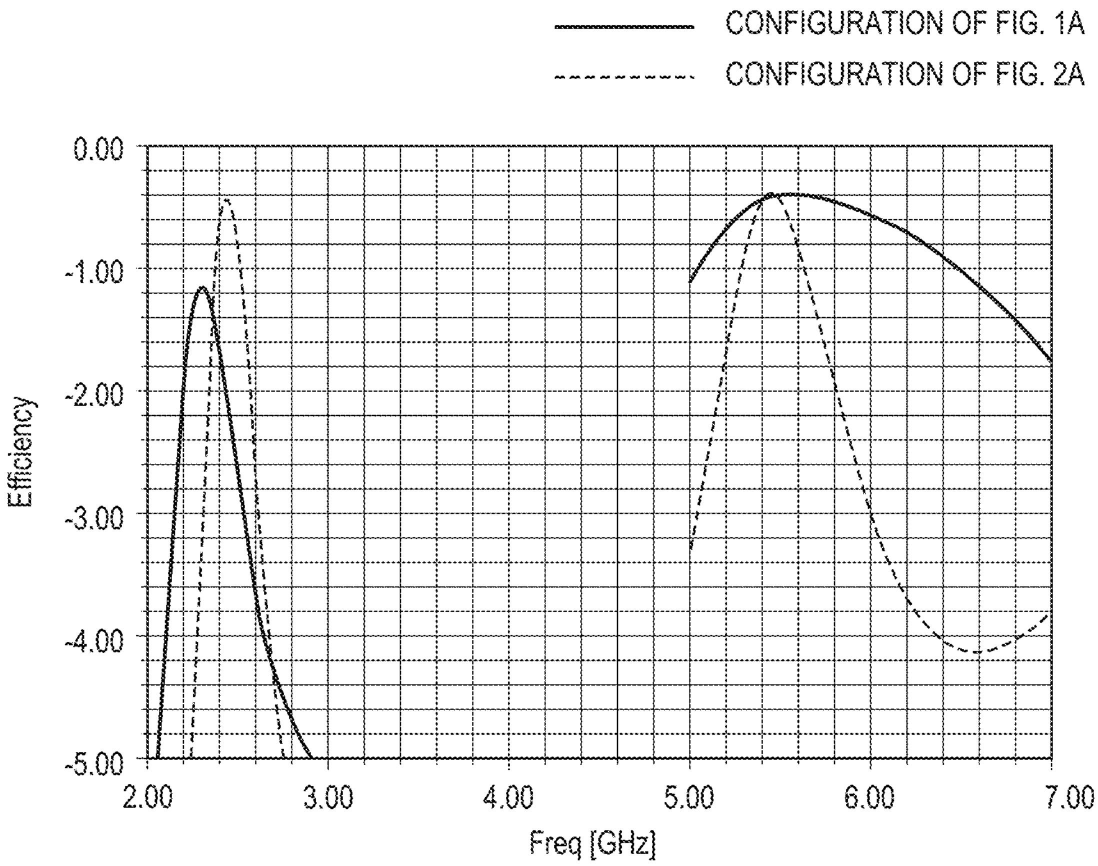
FIG. 3 is a comparative diagram of radiation characteristics of the antenna apparatuses illustrated in FIGS. 1A and 2A.

FIG. 3 illustrates a radiation efficiency characteristic, for which a radiation efficiency has been calculated for each frequency by simulation, for each of the antenna apparatuses of FIGS. 1A and 2A. In FIG. 3, the radiation efficiency characteristic of the antenna apparatus 1 illustrated in FIG. 1A is indicated with solid lines, and the radiation efficiency characteristic of the antenna apparatus illustrated in FIG. 2A is indicated with broken lines.

According to FIG. 3, bandwidths of radiation efficiency characteristics in a low-frequency band (around 2.4 GHZ) are almost the same. However, regarding the radiation efficiency in a high-frequency band (around 5 to 7 GHZ), the configuration of FIG. 1A is approximately double in a bandwidth in which a radiation efficiency greater than or equal to −3 dB (decibels) is attained compared to the configuration of FIG. 2A.

As described above, according to the present embodiment, the antenna apparatus 1 resonates at different frequency bands corresponding to each current path. Further, by the feeding line being arranged so as to obliquely straddle the aperture portion 102, the antenna apparatus 1 can operate as a dual-band antenna in which a broadband radiation efficiency characteristic is attained in the second frequency $f_2$, which is higher than the first frequency $f_1$.

In the present embodiment, description has been given assuming that the feeding line 106 is a strip line but may be a thin wire coaxial cable or may include a balun, which converts an unbalanced connection to a balanced connection, and the feeding line 106 may be connected to the first conductor 101. Further, in the present embodiment, description has been given assuming that the antenna apparatus 1 is a transmitting antenna that transmits electromagnetic waves supplied from the feeding unit 107, but the antenna apparatus 1 may be a receiving antenna that receives electromagnetic waves. In this case, the feeding unit 107 may be replaced with a high-frequency receiving circuit.

The materials and thicknesses, shapes, and other parameters of the materials indicated here are only examples, and all conditions under which the same effects can be obtained are encompassed in the embodiment.

Second Embodiment

FIG. 4 and FIGS. 5A to 5C are examples of the antenna apparatus according to the present embodiment.

Figure 4:
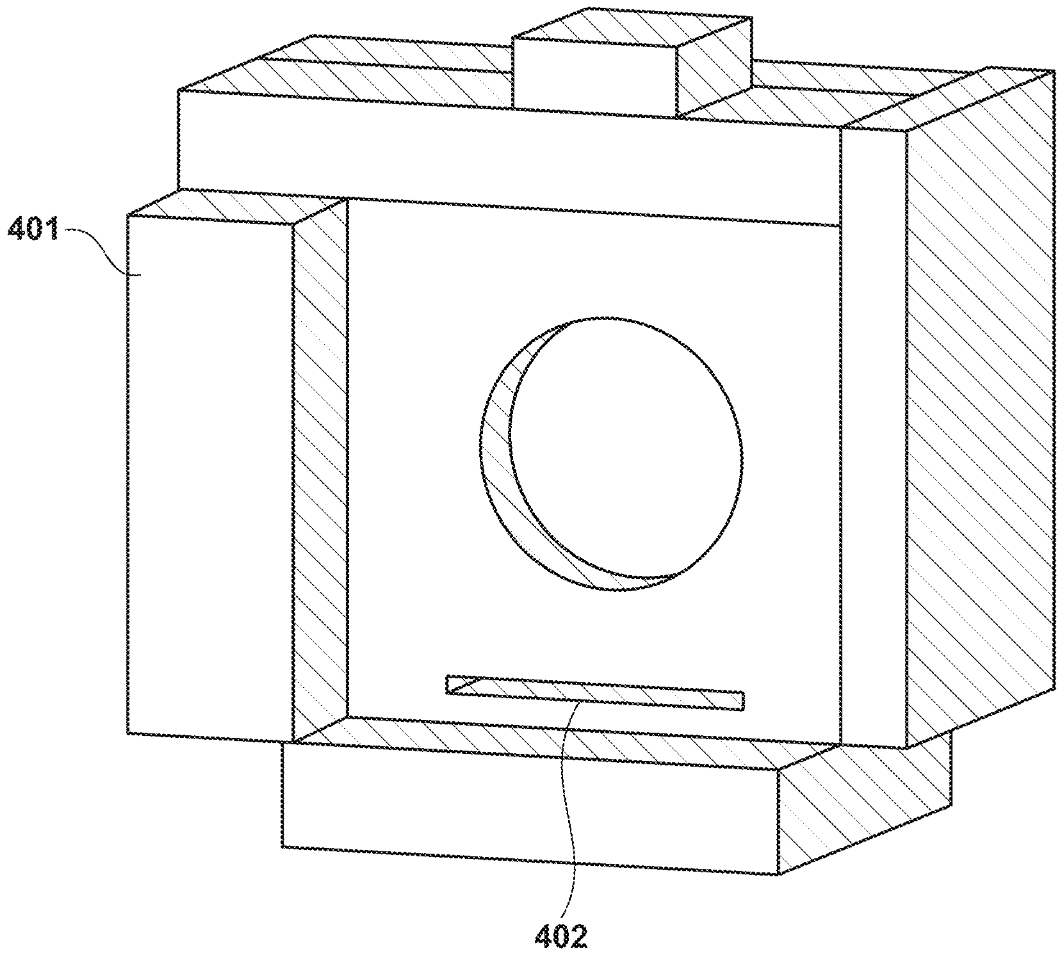
FIG. 4 is a diagram illustrating an embodiment of the antenna apparatus.

In FIG. 4, a housing 401 of an imaging apparatus, which is a conductor having a space within, is provided with an aperture portion 402, which serves as a slot antenna element. The housing 401 is a conductor in which a closed space is formed and may be formed by engaging, adhering, or joining a plurality of conductors. In the present embodiment, the housing 401 is illustrated as a housing of an imaging apparatus, but the antenna apparatus according to the present embodiment can be applied to a housing of a different apparatus.

Figure 5B:
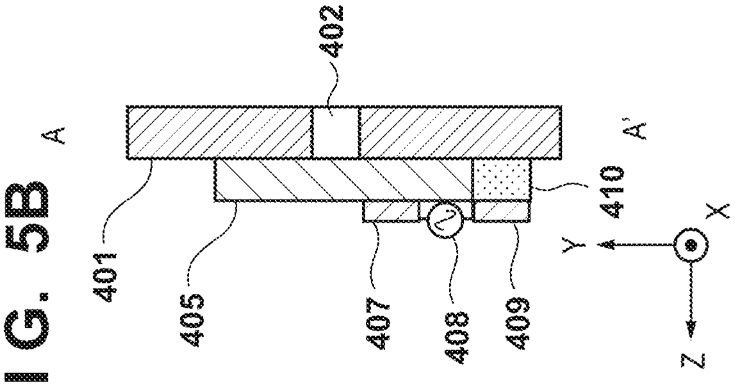
FIGS. 5A to 5C are diagrams illustrating the embodiment of FIG. 4.
Figure 5A:
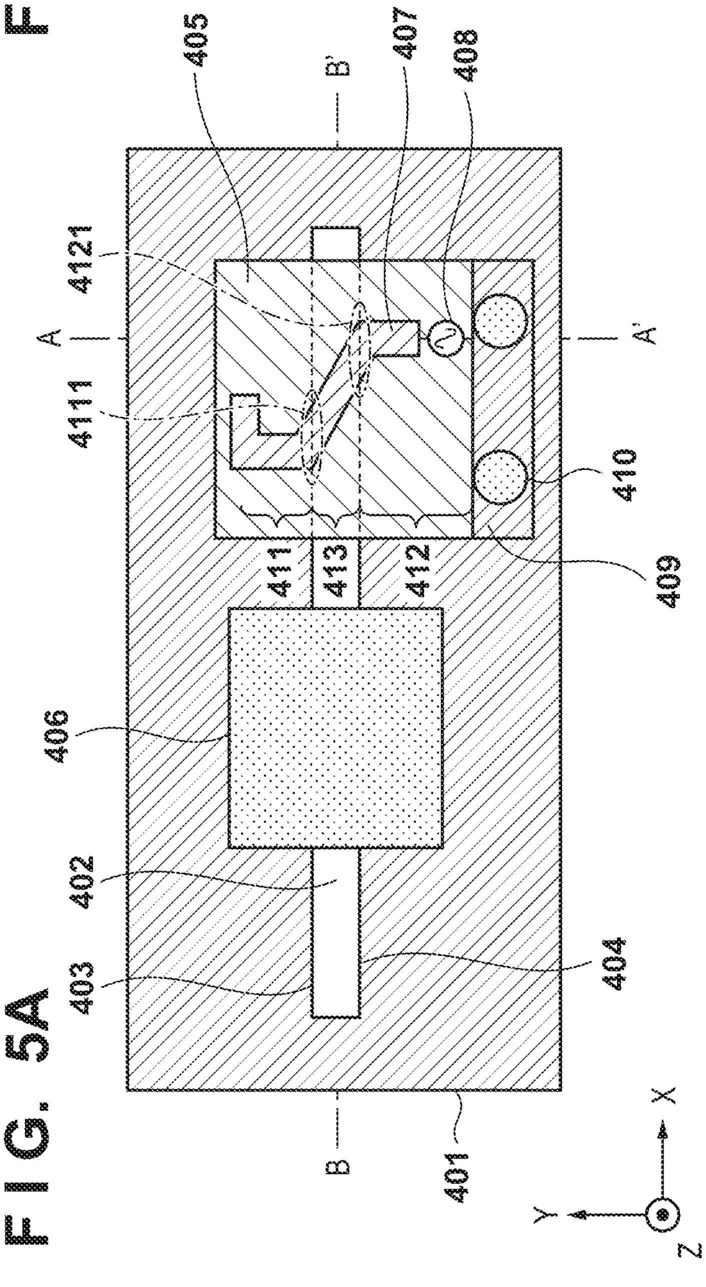
Figure 5C:
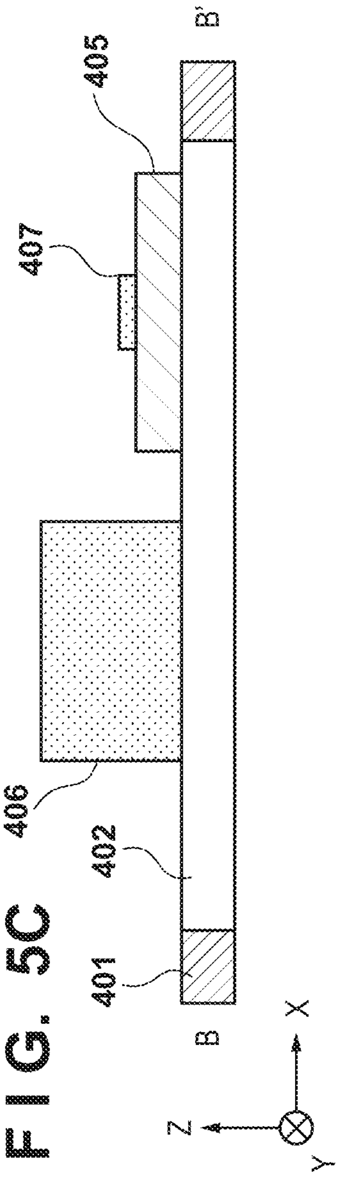

FIG. 5A illustrates a portion of the housing 401 in which the aperture portion 402 is arranged. FIG. 5B is a cross-sectional view of the antenna apparatus that includes the housing 401 on the YZ plane along a dashed line A-A' of FIG. 5A. FIG. 5C is a cross-sectional view of the antenna apparatus that includes the housing 401 on an XZ plane along a dashed line B-B' of FIG. 5A.

The aperture portion 402 includes a first side 403 and a second side 404 in a lengthwise direction and has an electrical length approximately equal to one-half ($\lambda_1/2$) of the wavelength 21 of the first frequency $f_1$. For example, when the first frequency is set to 2.4 GHZ, $\lambda_1/2$=49 mm, and $\lambda_1/4$=25 mm. The first side 403 and the second side 404 of the aperture portion 402 are approximately parallel.

In the housing 401, a substrate 405 made of a dielectric and a built-in component 406, which is a conductor, is arranged at positions facing an aperture surface of the aperture portion 402. A feeding line 407, a feeding unit 408, and a ground of the feeding unit (GND) 409 are arranged on the substrate 405. Here, built-in components (e.g., imaging unit for functioning as an imaging apparatus) that include the feeding line 407 and the feeding unit 408 may be arranged in an internal space of the housing 401.

The housing 401 and the GND 409 of the feeding unit are electrically connected, and the housing 401 and the substrate 405 are connected by a fixing member 410, such as a screw, at a position of the GND 409 of the feeding unit. The fixing member 410 may be a conductor in one example, and thereby, it is possible to electrically connect GNDs between the housing 401 and the feeding unit 408.

When viewed from the stacking direction, the feeding line 407 includes a first portion 411, a second portion 412, and a third portion 413. When viewed from the stacking direction, the first portion 411 is a partial line of the feeding line 407 that includes a portion from an intersection 4111 where the first side 403 and the feeding line 407 intersect to an open end of the feeding line 407. When viewed from the stacking direction, the second portion 412 is a partial line of the feeding line 407 that includes a portion from an intersection 4121 where the second side 404 and the feeding line 407 intersect to a feeding terminal. When viewed from the stacking direction, the third portion 413 is a portion of the feeding line 407 obliquely straddling the aperture portion 402. Description will be omitted for the principle of operation of the slot antenna as it is similar to that of the first embodiment.

Here, the first portion 411 has an electrical length equal to one-fourth of the wavelength A of the first frequency $f_1$, and the second portion 412 is arranged at a position that is one-half ($\lambda_2/2$) of the wavelength 22 of the second frequency $f_2$ from one end of the second side 404. In the present embodiment, at the second frequency 5 GHZ, half of the wavelength, $\lambda_2/2$, =32.5 mm.

In addition, to reduce the size of the substrate 405, a portion of the first portion 411 is arranged so as to extend to be parallel to the first side 403 of the aperture portion 402. However, the first portion 411 may be arranged so as to be perpendicular to the first side 403 of the aperture portion 402 when viewed from the stacking direction as in FIG. 1A or may be obliquely arranged.

Further, the third portion 413 of the feeding line 407 is angled toward the built-in component 406. In other words, as illustrated in FIG. 5A, an orientation of the third portion 413 on the XY plane is determined such that a distance from the built-in component 406 to the intersection 4111 is shorter than a distance from the built-in component 406 to the intersection 4121. This makes it possible to prevent coupling between the built-in component 406 and the second portion 412 of the feeding line 407 and reduce the influence of the built-in component 406.

A resin cover or the like (not illustrated), which is a non-conductor, may be arranged outside of the housing 401 of the aperture portion 402 for dust-proofing, splash-proofing, and the like. The non-conductor may be arranged so as to cover the aperture surface of the aperture portion 402.

As described above, according to the present embodiment, it is possible to implement a dual-band slot antenna that has a broadband radiation efficiency characteristic even when the antenna apparatus is embedded into a housing of an imaging apparatus and a conductor, such as a built-in component, is present in the vicinity of the aperture portion in the housing.

In the present embodiment, description has been given assuming that the feeding line 407 is a strip line but may be a thin wire coaxial cable or may include a balun, which converts an unbalanced connection to a balanced connection, and the feeding line 407 may be connected to the first conductor 401. Further, in the present embodiment, description has been given assuming that the antenna apparatus 1 is a transmitting antenna that transmits electromagnetic waves supplied from the feeding unit 408, but the antenna apparatus 1 may be a receiving antenna that receives electromagnetic waves. In this case, the feeding unit 107 may be replaced with a high-frequency receiving circuit. Further, the feeding unit 107 may include a receiving circuit.

The materials and thicknesses, shapes, and other parameters of the materials indicated here, are examples, and all conditions under which the same effects can be obtained are included in the embodiment.

Third Embodiment

Figure 6:
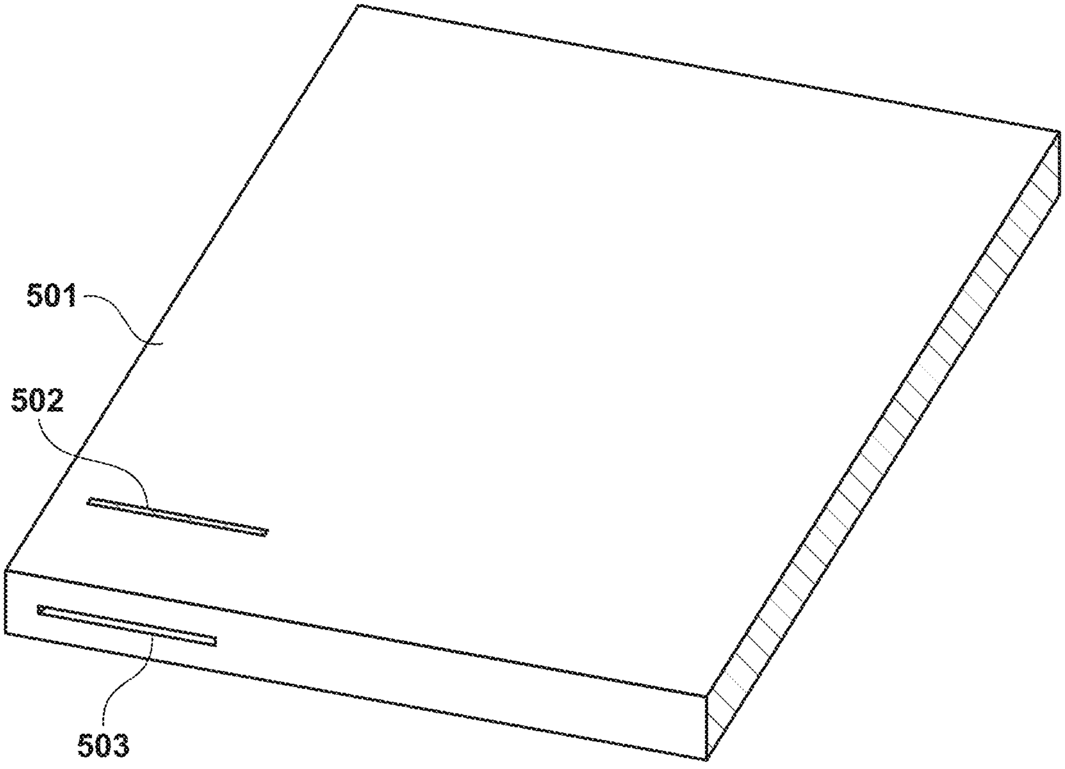
FIG. 6 is a diagram illustrating an embodiment of the antenna apparatus.
Figure 7B:
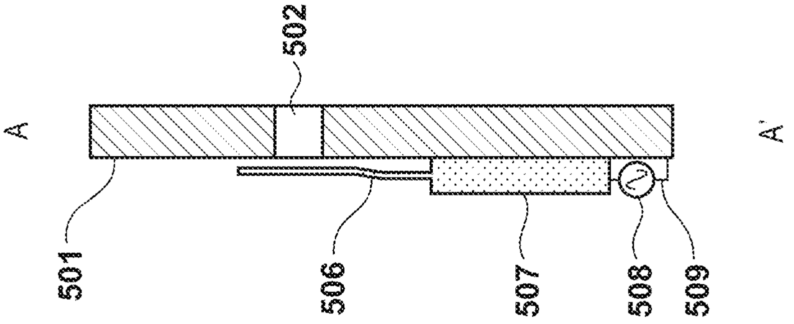
FIGS. 7A and 7B are diagrams illustrating the embodiment of FIG. 6.
Figure 7A:
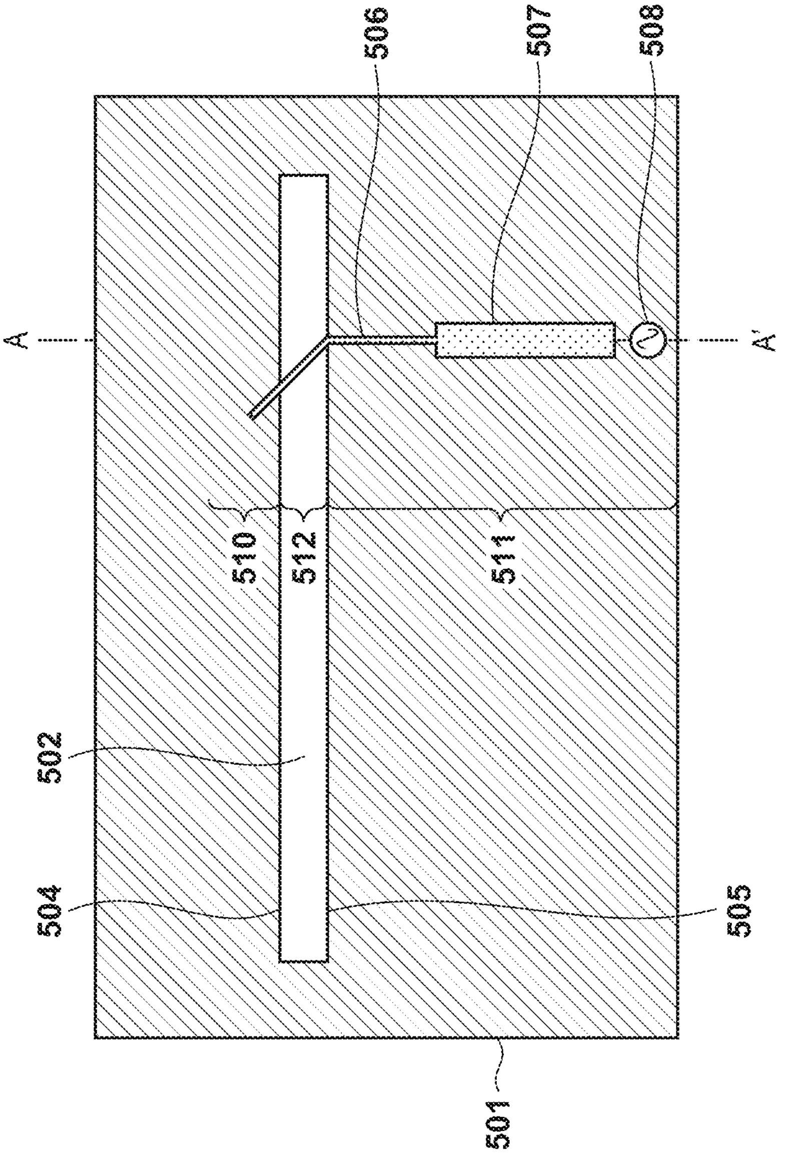

FIG. 6 illustrates an external view of a medical peripheral apparatus in which the antenna apparatus according to the present embodiment is adopted. FIGS. 7A and 7B illustrate a portion of a housing 501 of a medical peripheral apparatus.

Regarding the housing 501 of the medical peripheral apparatus of FIG. 6, a first aperture portion 502 and a second aperture portion 503, which function as slot antenna elements (in other words two slot antennas) are configured on different surfaces. FIG. 7A is an enlarged view of a periphery of the first aperture portion 502 of FIG. 6.

The housing 501 includes a conductor in which a closed space is formed. The housing 501 and may be formed by engaging, adhering, or joining a plurality of conductors. In the closed space, a thin wire coaxial cable that includes a core wire 506 and a covering 507, a high frequency circuit that includes a feeding unit 508 and a GND line 509, and other units for realizing functions as a medical peripheral apparatus are arranged.

The aperture portion 502 includes a first side 504 and a second side 505 in a lengthwise direction and has an electrical length approximately equal to one-half ($\lambda_1/2$) of the wavelength $\lambda_1$ of the first resonating frequency $f_1$. In the present configuration, when the first frequency is set to 2.4 GHZ, $\lambda_1/2$=49 mm, and $\Delta_1/4$=25 mm.

The thin wire coaxial cable is implemented so as to face a surface in which the aperture portion 502 is provided in the housing 501 of the medical peripheral apparatus.

The thin wire coaxial cable is constituted by the core wire 506, which functions as a feeding line, and the covering 507, which functions as a GND. The core wire 506 includes a first portion 510 that includes a portion from an intersection with the first side 504 to an open end, a second portion 511 that includes a portion from an intersection with the second side 505 to a feeding terminal, and a third portion 512 that obliquely straddles the aperture portion 502. Further, the covering 507, which is a GND of the thin wire coaxial cable, is electrically connected to the housing 501 of the medical peripheral apparatus. Further, the GND line 509, which is a GND of the feeding unit 508, is electrically connected to the housing 501.

Here, the first portion 510 has an electrical length equal to one-fourth of the wavelength $\lambda_1$ of the first frequency $f_1$. The second portion 511 is arranged at a distance that is one-half of the wavelength $\lambda_2$ of the second frequency $f_2$ from one end of the second side 505, and the wavelength $\lambda_2$ of the second frequency $f_2$ is shorter than the wavelength A of the first frequency $f_1$. In the present embodiment, at the second frequency 5 GHZ, the wavelength $\lambda_2/2$=32.5 mm.

Since the first portion 510 is equal to one-fourth of the wavelength λ of the first frequency $f_1$ in electrical length, the core wire 506 and the aperture portion 502 are electrically coupled. Therefore, when an electromagnetic wave that includes the first frequency or the second frequency is inputted from the thin wire coaxial cable to the core wire 506, it is fed from the core wire 506 to the aperture portion 502, and a function as a slot antenna can be realized. Description will be omitted for the principle of operation of the slot antenna as it is similar to that of the first embodiment.

An antenna that includes the second aperture portion 503 has a configuration similar to an antenna in which the aperture portion 502 is the antenna element illustrated in FIG. 7. The thin wire coaxial cable for feeding the aperture portion 502, and a thin wire coaxial cable for feeding the aperture portion 503 are arranged so as not to be electrically influenced by each other.

In the present embodiment, the aperture portions 502 and 503 are set to be the same size, but the aperture portions 502 and 503 may have different sizes. For example, by designing the aperture portion 502 to resonate at a third frequency $f_3$, and the aperture portion 503 to resonate at a fourth frequency $f_4$, the antenna apparatus can cover even more frequency bands.

In the present embodiment, description has been given assuming that power is fed to the aperture portion by the thin wire coaxial cable, but a balun, which converts unbalanced connection to balanced connection, may be included, or direct connection as is to the antenna may be established. The materials and thicknesses, shapes, and other parameters of the materials indicated here, are examples, and the present disclosure is not limited to the present embodiment.

Fourth Embodiment

Figure 8:
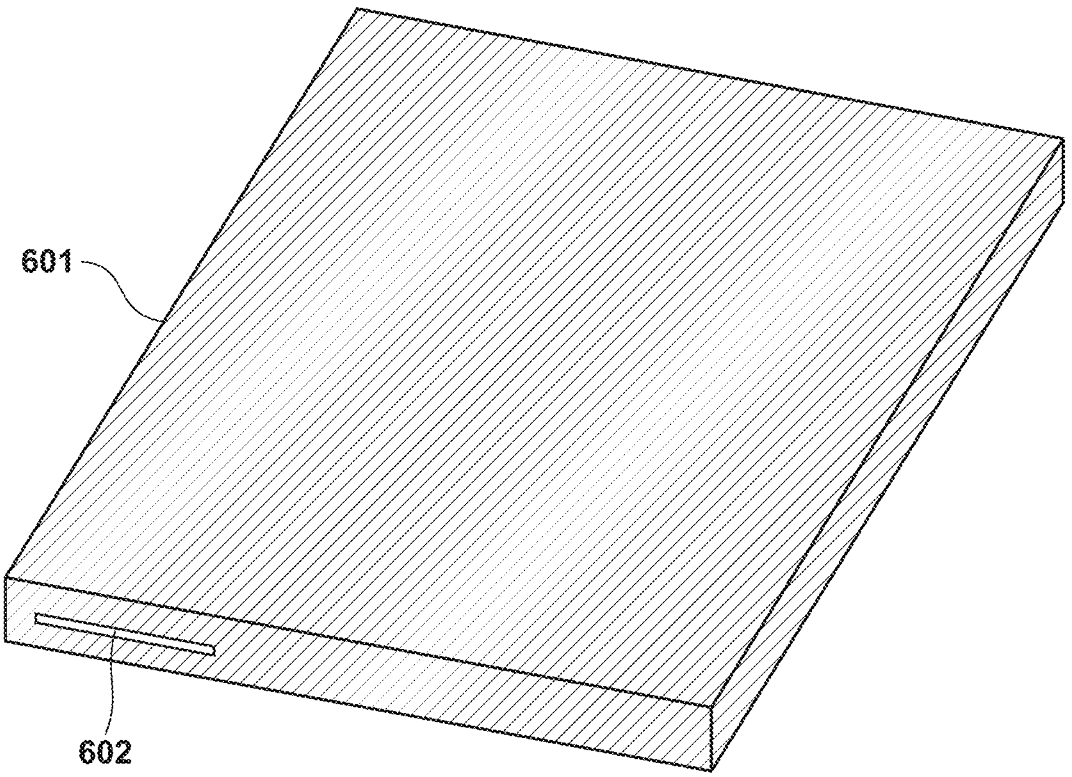
FIG. 8 is a diagram illustrating an embodiment of the antenna apparatus.
Figure 9B:
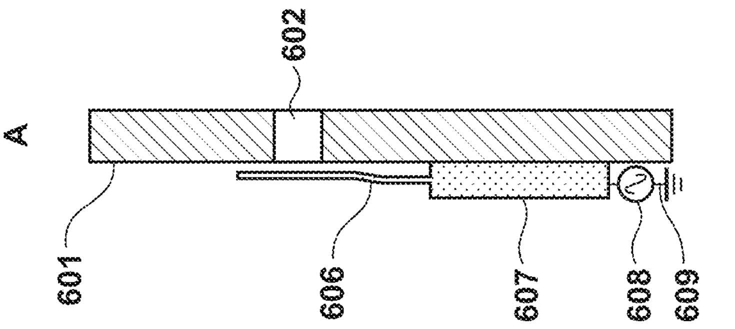
FIGS. 9A and 9B are diagrams illustrating the embodiment of the antenna apparatus according to FIG. 8.
Figure 9A:
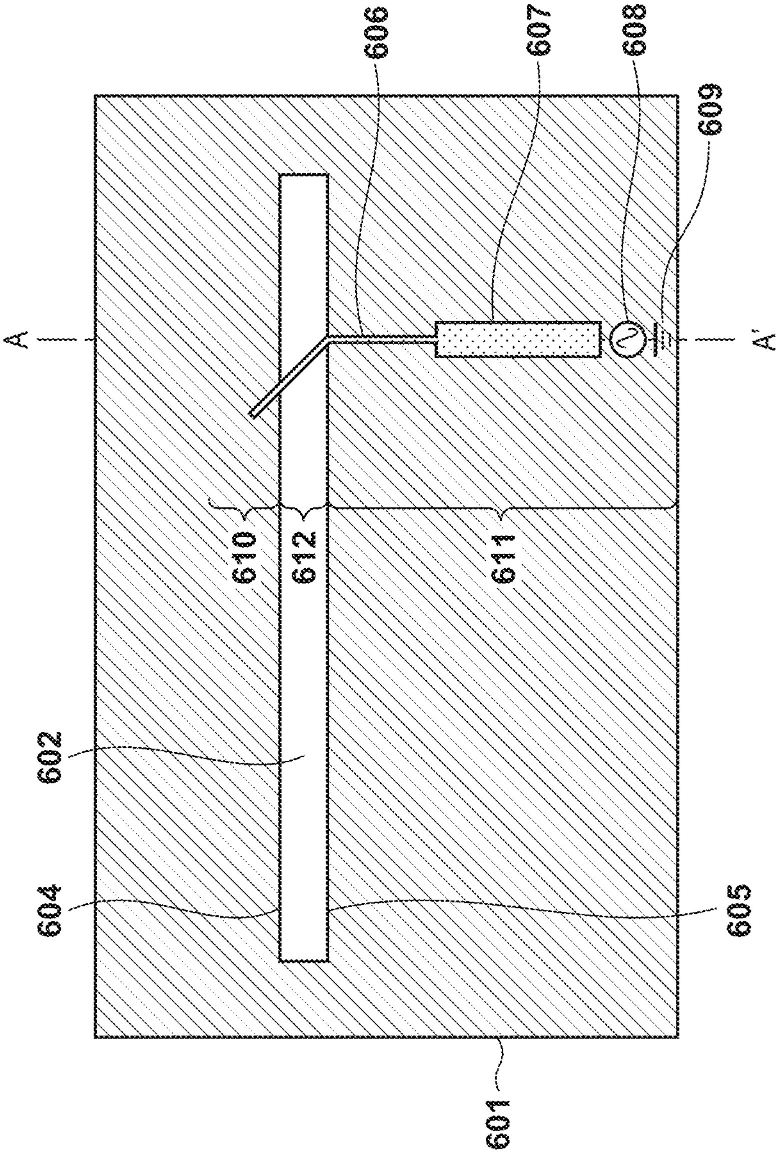

FIG. 8 illustrates an external view of a medical imaging apparatus in which the antenna apparatus according to the present embodiment is adopted. FIGS. 9A and 9B illustrate a portion of a housing 601 of the medical imaging apparatus.

The housing 601 of the medical imaging apparatus of FIG. 8 includes a first aperture portion 602 that functions as a slot antenna element. FIG. 9B is an enlarged view of a periphery of the first aperture portion 602 of FIG. 8. The housing 601 includes a conductor in which a closed space is formed. The housing 601 and may be formed by engaging, adhering, or joining a plurality of conductors. In the closed space, a thin wire coaxial cable that includes a core wire 606 and a covering 607, a high frequency circuit that includes a feeding unit 608 and a GND line 609, and other units for realizing functions as a medical imaging apparatus are arranged.

The aperture portion 602 includes a first side 604 and a second side 605 in a lengthwise direction and has an electrical length approximately equal to one-half ($\lambda_1/2$) of the wavelength $\lambda_1$ of the first resonating frequency $f_1$. In the present configuration, when the first frequency is set to 2.4 GHZ, $\lambda_1/2$=49 mm, and $\lambda_1/4$=25 mm.

The thin wire coaxial cable is mounted so as to face a surface in which the aperture portion 602 is provided in the housing 601 of the medical imaging apparatus.

The thin wire coaxial cable is constituted by the core wire 606, which functions as a feeding line, and the covering 607, which functions as a GND. The core wire 606 includes a first portion 610 that includes the core wire 606 from an intersection with the first side 604 to an open end, a second portion 611 that includes the core wire 606 from an intersection with the second side 605 to a feeding terminal, and a third portion 612 that obliquely straddles the aperture portion 602.

The first portion 610 has an electrical length equal to one-fourth of the wavelength λ of the first frequency $f_1$. The second portion 611 is arranged at a distance that is one-half of the wavelength $\lambda_2$ of the second frequency $f_2$ from one end of the second side 605, and the wavelength $\lambda_2$ of the second frequency $f_2$ is shorter than the wavelength A of the first frequency $f_1$. In the present embodiment, at the second frequency 5 GHZ, the wavelength $\lambda_2/2$=32.5 mm.

Here, the covering 607, which functions as a GND of the feeding line, is not electrically connected with, that is, insulated from, the housing 601 of the medical imaging apparatus. For example, by arranging an insulating structure that includes an insulator or a dielectric between the housing 601 and the covering 607, it is possible to isolate the covering 607 and the housing 601. In another example, the housing 601 and the covering 607 can be isolated by separating the covering 607 and the housing 601. Further, the GND line 609 of the feeding unit 608 is not electrically connected to the housing 601. For example, by connecting the GND line 609 to a GND that is not connected to the housing 601, it is possible to isolate the GND line 609 and the housing 601.

With this configuration, static electricity and noise that flow to the housing 601 are not superposed on the covering 607 and the GND line 609, which are connected to the high frequency circuit unit, and so, prevention of failure due to static electricity and the effect of reduction of noise in a captured image can be expected.

Further, in order to prevent unintentional, unwanted radiation from the covering 607, the covering 607, which is the GND of the thin wire coaxial cable, is set to a length and a shape that do not resonate at the first frequency $f_1$ and the second frequency $f_2$. For example, the length of the covering 607 may be a length that does not include wavelength $\lambda_1/4$ and wavelength $\lambda_2/4$. In another example, the covering 607 may be shaped so that it can be arranged at a position such that it is electrically coupled with another conductor different from the housing 601. For example, it may be connected to the GND line 609 of the feeding unit 608. This makes it possible to increase the surface area of a conductor of the covering 607, which serves as a GND, and prevent radiation of unwanted electromagnetic waves from the covering 607.

Since the first portion 610 is equal to one-fourth of the wavelength λ of the first frequency $f_1$ in electrical length, the core wire 606 and the aperture portion 602 are electrically coupled. Therefore, when an electromagnetic wave that includes the first frequency $f_1$ or the second frequency $f_2$ is inputted from the thin wire coaxial cable to the core wire 606, it is fed from the core wire 606 to the aperture portion 602, and a function as a slot antenna can be realized. Description will be omitted for the principle of operation of the slot antenna as it is similar to that of the first embodiment.

In the present embodiment, description has been given assuming that the thin wire coaxial cable that includes the core wire 606 and the covering 607 is the feeding unit. However, the feeding line and the feeding unit may be formed by a microstrip line as in the first embodiment, and the feeding unit may include a balun that converts unbalanced connection to balanced connection. Further, in this case, as described above, lengths and shapes that do not resonate at the first frequency $f_1$ and the second frequency $f_2$ are set such that neither the covering 607 nor the GND line 609 emits unintentional, unwanted radiation. For example, the respective lengths of the covering 607 and the GND line 609 are different from both wavelength $\lambda_1/4$ and wavelength $\lambda_2/4$.

The materials and thicknesses, shapes, and other parameters of the materials indicated here, are examples, and all conditions under which the same effects can be obtained are included in the embodiment.

As described above, according to the present embodiment, by not electrically connecting the GNDs of the feeding line and the feeding unit and the housing, static electricity and noise that flows to the housing 601 is not superposed on the feeding line and the feeding unit which are connected to the high frequency circuit unit, and so, prevention of failure due to static electricity and the effect of reduction of noise in a captured image can be expected.

OTHER EMBODIMENTS

In the present embodiment, description has been given assuming that the antenna apparatus that forms the housing is an imaging apparatus or a medical peripheral apparatus, but it can be applied to a housing of other apparatuses. For example, it can also be applied to a housing of a communication apparatus, such as a personal computer or a smartphone.

In the present embodiment, description has been given assuming that the dielectric is 1-mm thick FR4-epoxy, but it may be a ferroelectric material. In this case, it is possible to reduce the size of the feeding line 106 due to a wavelength shortening effect.

In the present embodiment, description has been given assuming that the aperture portion 102 is rectangular. However, it may be a shape different from a rectangle, such as an ellipse, a trapezoid or a parallelogram, and any aperture that includes two approximately parallel sides can be applied to the present embodiment. Further, depending on the shape of the housing, the aperture may have a three-dimensional shape rather than being on an XY plane.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-100271, filed Jun. 19, 2023 and Japanese Patent Application No. 2023-193058, filed Nov. 13, 2023, which are hereby incorporated by reference herein in their entirety.

What is claimed is:

1. An antenna apparatus that operates at first and second operating frequencies, the antenna apparatus comprising:

a first conductor including an aperture portion including approximately parallel first and second sides; and a feeding line arranged so as to be separated from the aperture portion, wherein when viewed from a stacking direction of the aperture portion and the feeding line, the feeding line includes:

a first portion that includes a portion from a first intersection of the first side and the feeding line to an open end of the feeding line, a second portion that connects a second intersection of the second side and the feeding line and a feeding unit, and a third portion that connects the first intersection and the second intersection so as to obliquely straddle the aperture portion, and a distance from the second intersection to one end of the second side and a distance from the second intersection to the other end of the second side are different.

2. The antenna apparatus according to claim 1, wherein an electrical length from the first intersection to the open end is an electrical length approximately equal to one-half of a length of at least one of the first side and the second side.

3. The antenna apparatus according to claim 1, wherein an electrical length from the first intersection to the open end is approximately equal to one-half of a wavelength of an electromagnetic wave of the first operating frequency.

4. The antenna apparatus according to claim 1, wherein a length from the second intersection to the one end of the second side is approximately equal to one-half of a wavelength of an electromagnetic wave of the second operating frequency.

5. The antenna apparatus according to claim 1, wherein the first portion includes a line extending parallel to the first side.

6. The antenna apparatus according to claim 1, wherein a dielectric is arranged between the aperture portion and the third portion.

7. The antenna apparatus according to claim 1, wherein a ground of the feeding unit and the first conductor are electrically connected.

8. The antenna apparatus according to claim 1, wherein the aperture portion is rectangular.

9. The antenna apparatus according to claim 1, wherein the first conductor forms a closed space, and the feeding line is arranged in the closed space.

10. The antenna apparatus according to claim 1, further comprising:

a second conductor arranged at a position facing an aperture surface of the aperture portion, wherein a distance from the first intersection to the second conductor is smaller than a distance from the second intersection to the second conductor.

11. The antenna apparatus according to claim 1, wherein at least one surface of the aperture portion is covered by a non-conductor.

12. The antenna apparatus according to claim 1, wherein the first conductor forms a housing, the aperture portion is arranged on a first surface of the housing, and a second aperture portion, which includes approximately parallel third and fourth sides, is arranged on a second surface, which is different from the first surface, and the antenna apparatus further comprises a second feeding line arranged separated from the second aperture portion, and when viewed from a stacking direction of the second aperture portion and the second feeding line, the second feeding line is arranged so as to obliquely straddle the third and fourth sides of the second aperture portion.

13. The antenna apparatus according to claim 1, wherein the first operating frequency is lower than the second operating frequency.

14. The antenna apparatus according to claim 13, wherein the first operating frequency is included in a 2.4-GHz (gigahertz) band, and the second operating frequency is included in a 5-GHz band.

15. The antenna apparatus according to claim 1, wherein a ground of the feeding unit and the first conductor are not electrically connected.

16. The antenna apparatus according to claim 15, wherein a conductor on a ground side of the feeding unit does not resonate at the first and second frequencies.

* * * * *